(12) United States Patent
Bauer

(10) Patent No.: US 7,179,078 B1
(45) Date of Patent: Feb. 20, 2007

(54) FOOD SCOOP

(76) Inventor: Jeffrey R. Bauer, 900 Bitner Rd., #D17, Park City, UT (US) 84098

( * ) Notice: Subject to any disclaimer, the term of this patent is extended or adjusted under 35 U.S.C. 154(b) by 278 days.

(21) Appl. No.: 10/402,206

(22) Filed: Mar. 28, 2003

Related U.S. Application Data

(60) Provisional application No. 60/368,369, filed on Mar. 28, 2002.

(51) Int. Cl.
*A23G 9/28* (2006.01)

(52) U.S. Cl. ...................................... 425/283; 425/318

(58) Field of Classification Search ........ 425/276–286, 425/318; D7/681; 30/324
See application file for complete search history.

(56) References Cited

U.S. PATENT DOCUMENTS

| | | | | |
|---|---|---|---|---|
| 1,480,398 A | * | 1/1924 | Kirchhoff | .................... 425/278 |
| 1,540,089 A | * | 6/1925 | Schmelter | .................... 425/283 |
| 1,588,413 A | * | 6/1926 | Hardy | ......................... 425/280 |
| 1,699,914 A | | 1/1929 | Persson | |
| 1,718,555 A | * | 6/1929 | Halset | ......................... 425/278 |
| 1,826,651 A | * | 10/1931 | Chisholm | .................... 425/221 |
| 2,003,197 A | | 5/1935 | Jackson | |
| 2,109,598 A | * | 3/1938 | Stasinski et al. | ............ 425/278 |
| 2,157,813 A | * | 5/1939 | Biskup | ........................ 425/278 |
| 2,232,393 A | * | 2/1941 | Knaust | ........................ 425/278 |
| 2,629,344 A | * | 2/1953 | Maxwell | ..................... 425/280 |
| 5,080,572 A | | 1/1992 | Sage | |
| D342,002 S | | 12/1993 | Sage | |

* cited by examiner

*Primary Examiner*—Donald Heckenberg
(74) *Attorney, Agent, or Firm*—Thorpe North & Western, LLP

(57) ABSTRACT

A scoop device for forming scoops of a material, such as ice cream or other foods, includes a frame adapted to be held in the hand of a used with a plunger extending into the user's palm to be operated by squeezing or closing the hand. A pair of scoop halves are pivotally connected to rotate between open and closed positions. A pivot plate is attached to the plunger to be moved relative to the frame by movement of the plunger. A pair of lever arms are coupled to the frame, the pivot plate, and the scoop halves so that movement of the pivot plate in relation to the frame causes movement of the lever arms and, in turn, rotation of the scoop halves between open and closed positions. The lever arms each have opposite ends and an intermediate fulcrum. The device can be biased to normally maintain the scoop halves in either open or closed position, as by a spring arranged to bias the plunger. It is preferred that the scoop halves be elongated in the direction of insertion of the scoop into the material to be scooped to ease the release of scoops of material from the scoop.

29 Claims, 6 Drawing Sheets

FOOD SCOOP

RELATED APPLICATION

Figure 1:
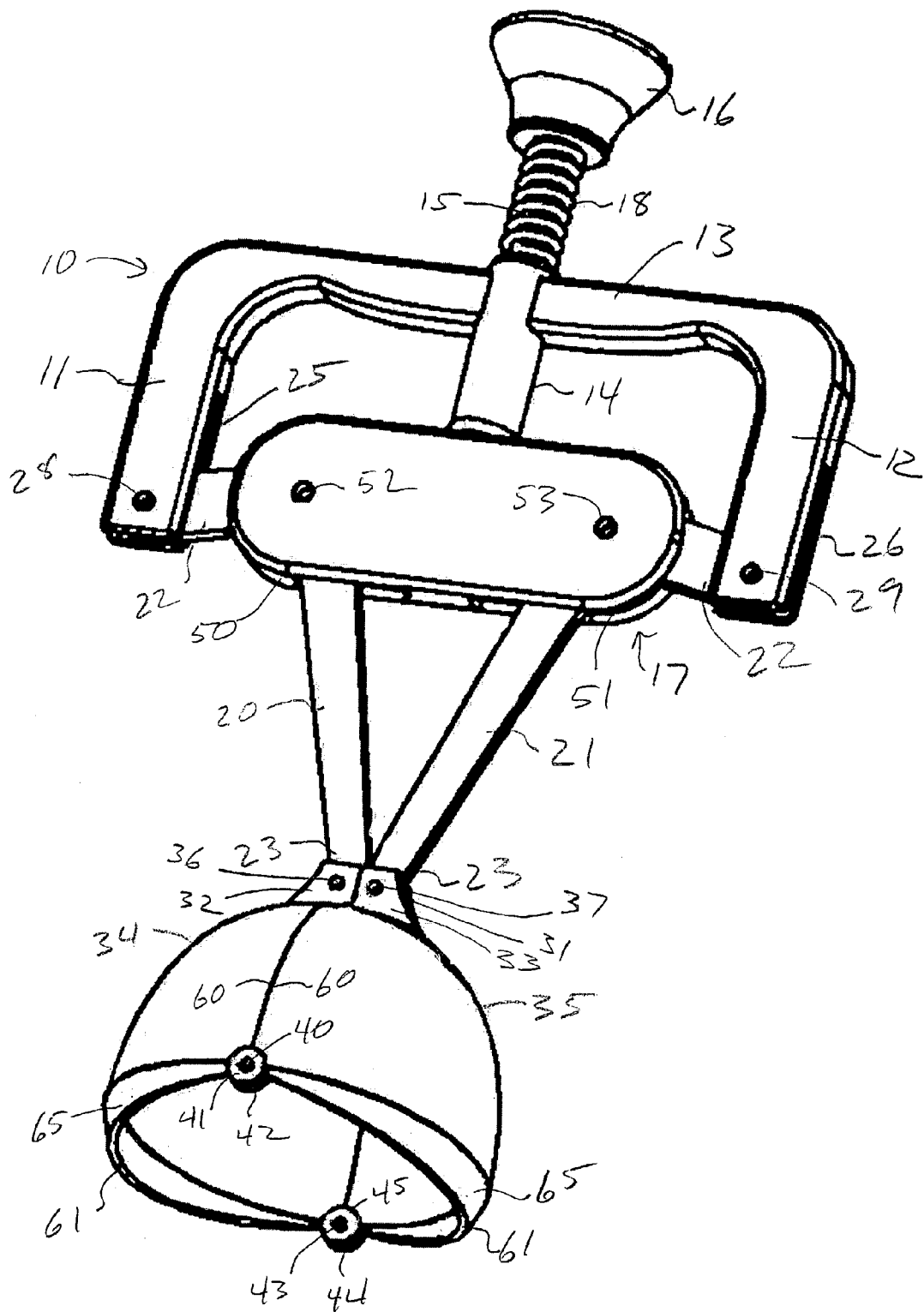

This application claims the benefit of provisional Application Ser. No. 60/368,369, filed Mar. 28, 2002, and entitled Food Scoop.

BACKGROUND OF THE INVENTION

1. Field

The invention is in the field of scoops for materials such as food, for example ice cream, mashed potatoes, ground meat, and cookie dough.

2. State of the Art

Various types of scoops are known for scooping various materials, particularly food products such as ice cream, mashed potatoes, ground meat, and cookie dough. Most such scoops have a hemispherical or similarly shaped bowl attached to an elongate handle. A user holds the handle in his or her fist with a portion of the handle and the bowl extending therefrom and manipulates the handle and bowl in the material to be scooped to fill the bowl with the material. The manipulation is done mainly with the wrist. If the material being scooped is relatively hard, such as hard ice cream, it can be very difficult to manipulate the bowl in the material to fill the bowl and remove it from the material. If multiple scoops of material are desired, obtaining such multiple scoops can be very hard on the user's wrist. Various release mechanisms have been designed for use in such scoops to help release from the bowl a scoop of material that sticks to the bowl. However, this does not help in filling the bowl with the material. The various release aids included in such scoops indicates that releasing a scoop once obtained can be difficult.

U.S. Pat. No. 1,699,914 shows an apparatus for making meatballs which, similarly to the scoop devices described above, includes a hemispherical bowl or cup on the end of a handle so that the handle is held in a user's fist and is manipulated to manipulate the bowl or cup in the mass of meat material from which the meatballs are formed. The cup includes two hemispherical cups, one within the other, so that when inserted into the mass of meat, one cup is rotated with respect to the other to form a closed sphere with the meat material formed into a ball therein. A release mechanism is provided release the ball when the cups are opened.

Some scoop devices, such as a butter ball maker shown in U.S. Pat. No. 2,003,197 or a snowball maker shown in U.S. Pat. No. 5,080,572, include hemispherical bowls or molds on ends of handles arranged in scissor like devices which are inserted into and closed in the material to be formed into balls. These are also difficult to use and releasing the balls from the bowls can be difficult.

There remains a need for a scoop device that is easy to use, particularly to be inserted into relatively hard materials such as hard ice cream, and that reduces the use of the wrist in use of the scoop. It is also desirable to have a scoop device which easily releases the scoop of material from the device once it is scooped into the device.

SUMMARY OF THE INVENTION

According to the invention, a scoop device for producing scoops of a material, such as scoops of food like hard ice cream, includes a frame adapted to be held by a user with an open scoop, formed by two scoop halves, extending therefrom which can be pushed by a user, using the user's arm rather than wrist, into the material to be scooped. Wrist movement to force the scoop into the material is not necessary. When in the material to be scooped, the user can close the scoop by squeezing the hand which operates a plunger which rotates the scoop halves to a closed position similarly to a clamshell bucket or scoop. The closed scoop can then be removed from the material, moved to the desired location for the scoop of material, and the scoop of material released by opening the scoop halves.

The scoop device of the invention includes a frame adapted to be held in the hand of a used with a plunger extending into the user's palm to be operated by squeezing or closing the hand. A pair of scoop halves are pivotally connected to rotate between open and closed positions. A pivot plate is attached to the plunger to be moved relative to the frame by movement of the plunger. A pair of lever arms are coupled to the frame, the pivot plate, and the scoop halves so that movement of the pivot plate in relation to the frame causes movement of the lever arms and, in turn, rotation of the scoop halves between open and closed positions. The lever arms each have opposite ends and an intermediate fulcrum. One end of each lever arm is coupled to a scoop half, while the opposite end is coupled to either the frame or the pivot plate. If the opposite end is coupled to the frame, the fulcrum is coupled to the pivot plate. Conversely, if the opposite end of the lever arm is coupled to the pivot plate, the fulcrum is coupled to the frame. Relative movement of the pivot plate with respect to the frame, as caused by movement of the plunger, causes movement of the ends of the lever arms coupled to the scoop halves and rotation of the scoop halves between open and closed positions. The device can be biased to normally maintain the scoop halves in either open or closed position. Such biasing can be accomplished by biasing the plunger, as with a spring, to a position representing either open or closed position of the scoop halves. The frame may be substantially "C" shaped with the lever arms coupled to respective end portions of the "C" and with an intermediate portion adapted to be held by the user, and which slidingly mounts the plunger.

To aid in releasing a scoop of material formed in the device from the device, the scoop halves are not a portion of a sphere, but are elongated in the direction of insertion into the material to be scooped to form in cross section in the elongate direction a portion of an oval, such as a portion of an ellipse. It has been found that this produces a scoop of material in the closed scoop that easily falls from the scoop halves when opened.

THE DRAWINGS

Figure 2:
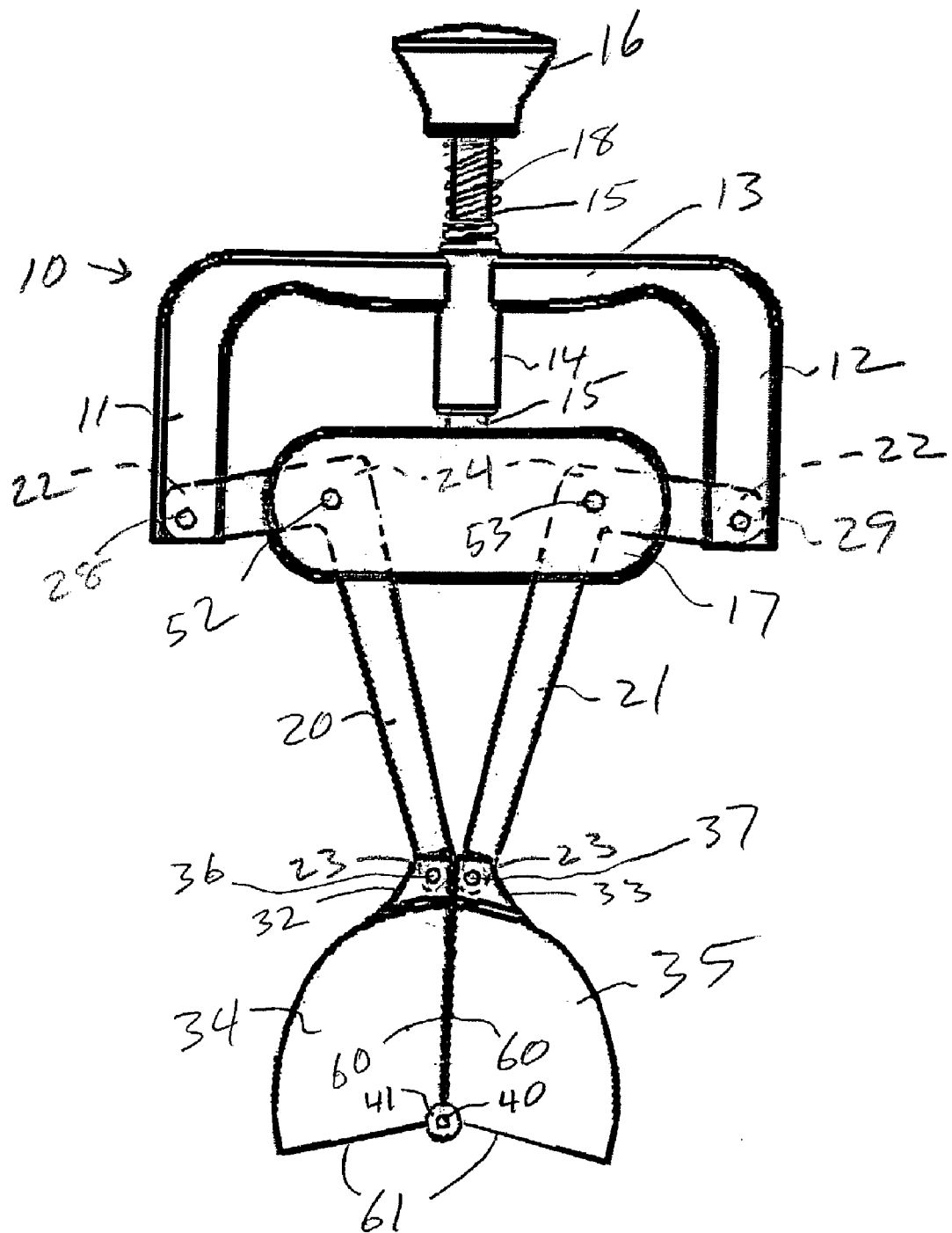
Figure 3:
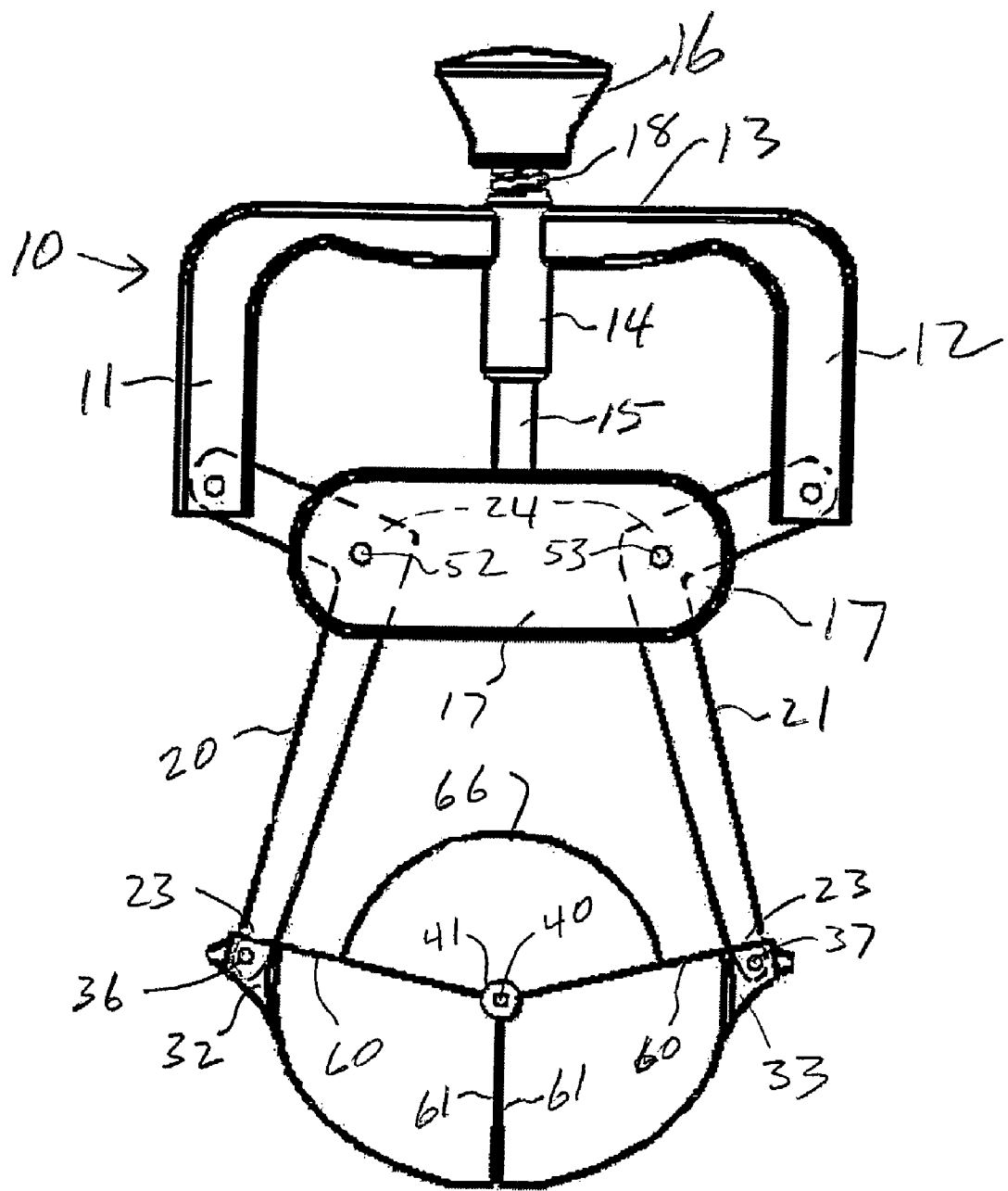
Figure 4:
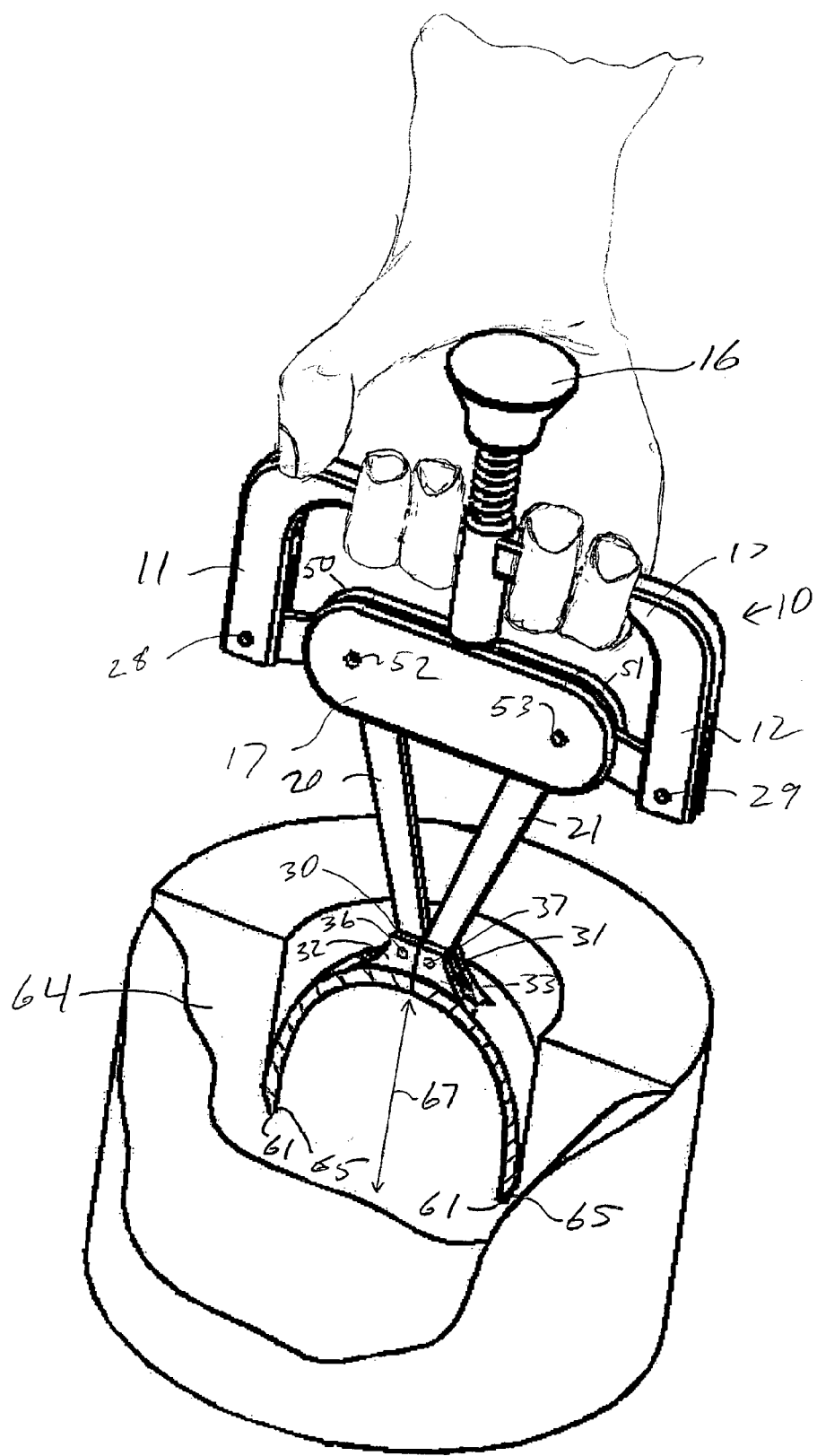
Figure 5:
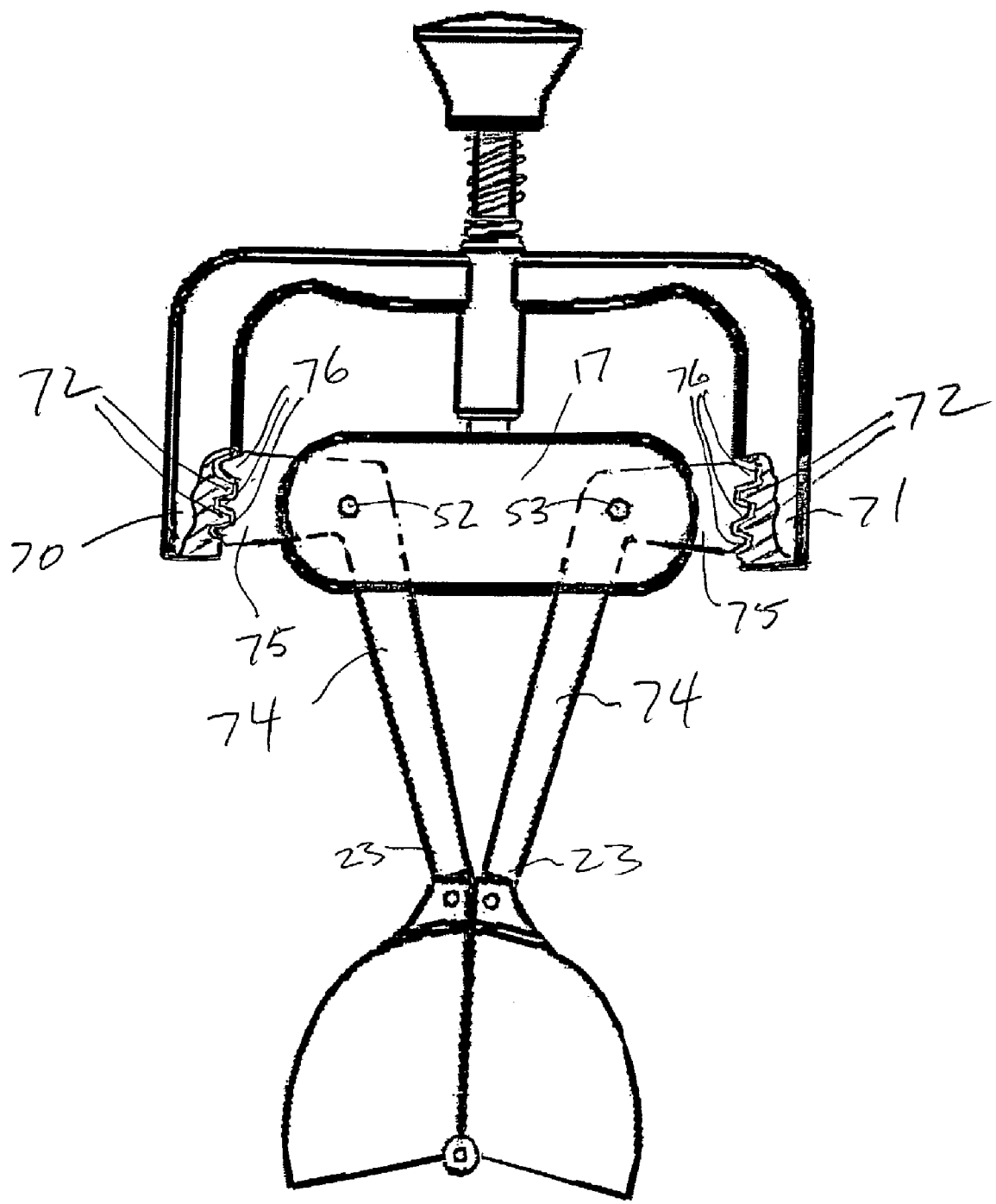
Figure 6:
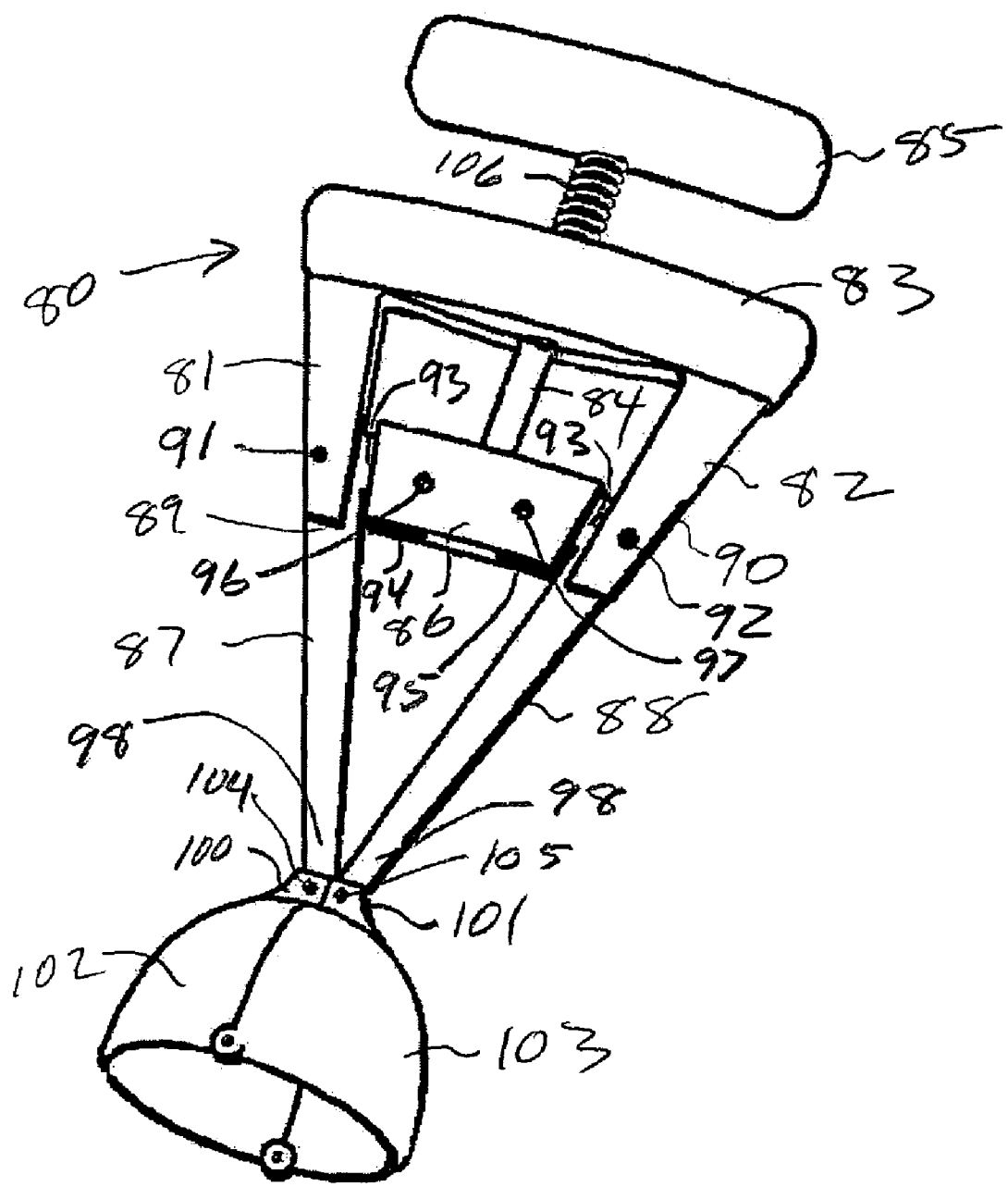

In the accompanying drawings, which show the best mode currently contemplated for carrying out the invention:

FIG. 1 is a perspective view of a scoop device of the invention showing the scoop in open position;

FIG. 2, a side elevation of the device of FIG. 1;

FIG. 3, a side elevation similar to that of FIG. 2, but showing the scoop in closed position;

FIG. 4, a perspective view of the device of FIGS. 1–3 showing the scoop in open position and the device held by a user and inserted into material to be scooped;

FIG. 5, a side elevation similar to that of FIG. 2, but showing a different embodiment of the device, with portions of the device frame broken away to show interior configurations; and FIG. 6, a side elevation of a further embodiment of the device of the invention.

DETAILED DESCRIPTION OF THE ILLUSTRATED EMBODIMENTS

The illustrated embodiments of the scoop device of the invention, in FIGS. 1–4, includes a frame 10 of generally "C" shape having opposite end portions 11 and 12 of the "C" and intermediate "C" portion 13. A sleeve 14 in the intermediate portion 13 provides a guideway for slidingly holding a plunger 15. Plunger 15 has opposite ends with a plunger handle 16 attached to the end of the plunger directed away from the opening of the "C", and a pivot plate 17 attached to the opposite end of the plunger to be positioned in the "C". The plunger 15 may be a separate piece or may be integrally formed as a part of and extending from either the pivot plate 17 or pivot handle 16. A spring 18 is positioned around plunger 15 between frame 10 and plunger handle 16 to bias the plunger to a position away from the opening of the "C" with the pivot plate 17 abutting the inner end of sleeve 14, or other wise stopped prior to abutting sleeve 14.

Lever arms 20 and 21 each have arm ends 22 and 23 and a fulcrum located in elbow 24. In the embodiment of FIGS. 1–4, the ends 22 of arms 20 and 21 fit into receiving slots 25 and 26 in frame end portions 11 and 12, respectively, and are rotatably and pivotally connected therein by pins 28 and 29, respectively, extending through end portions 11 and 12 of frame 10. The ends 23 of arms 20 and 21 fit into receiving slots 30 and 31 in tabs 32 and 33, respectively, extending from scoop halves 34 and 35, and are rotatably and pivotally connected therein by pins 36 and 37, respectively. Scoop halves 34 and 35 are pivotally connected by pin 40 extending through adjacent tabs 41 and 42 of scoop halves 34 and 35, respectively, and pin 43 extending through adjacent tabs 44 and 45 of scoop halves 34 and 35, respectively. The lever arms 20 and 21 are also pivotally connected through respective elbows 24 to pivot plate 17. Thus, pivot plate 17 includes slots 50 and 51 which receive the respective lever elbows 24 which are pivotally attached therein by pins 52 and 53, which form the respective fulcrums for the lever arms 20 and 21. The lever arms are configured so that with the connections described, when the pivot plate is in its position toward or abutting sleeve 14 within the "C", as shown in FIGS. 1 and 2, the scoop halves 34 and 35 are rotated to an open position ready to be pushed into material to be scooped. This is the position to which the scoop device is biased by spring 18.

By a comparison of FIGS. 2 and 3, it can be seen that when plunger handle 16 is moved against the bias of spring 18 toward frame portion 13, pivot plate 17 is moved away from frame portion 13 and moves the fulcrums of lever arms 20 and 21 which cause lever arms 20 and 21 to rotate about their fulcrums and ends 23 of lever arms 20 and 21 to move apart thereby rotating scoop halves 34 and 35 to closed position as shown in FIG. 3.

Scoop halves 34 and 35 are pivotally connected through tabs 41, 42, 44, and 45, and pins 40 and 43 so that the halves can rotate with respect to one another between open and closed position. Each half has an arcuate edge 60 and an arcuate edge 61. Tabs 41, 42, 44, and 45 are positioned where respective arcuate edges 60 and 61 intersect. In open position, respective arcuate edges 60 of each scoop half 34 and 35 come together. FIGS. 1 and 2 show these edges abutting, but they do not need to abut to be considered as together. A space can be present between the edges when together. For the device shown, open position can be defined when the edges 60 abut which stops further movement of pivot plate 17 toward frame portion 13 which may be before the pivot plate 17 abuts sleeve 14 as shown in FIG. 2, or may have a space therebetween when pivot plate 17 abuts sleeve 14 before edges 60 abut. In closed position, edges 61 come together. Again, the edges do not need to actually abut but may have some space therebetween. The amount of space allowable between edges 61 in closed position will depend upon the material being scooped. For example, the scoop will work well for forming scoops of and portioning most food items, such as ice cream, with a space up to about one-half of an inch. The space between the edges, if there is space, will usually vary along the length of the edge as the edges will usually be close to abutting at each end of the edge where it is hinged or pivotally attached to the edge of the other scoop half. Tabs 32 and 33, which provide the attachment of the lever arms 20 and 21 to the scoop halves, are positioned along edges 60 intermediate the ends thereof, and preferably centered between the ends thereof. It is further preferred that the pivot connections of the lever arms to the scoop halves, i.e., pivot pins 36 and 37 remain above pivot pins 40 and 43 connecting the scoop halves when the scoop halves are in closed position as shown in FIG. 3.

In use, as shown in FIG. 4, the scoop device of the invention is held in a hand of the user, generally with the fingers around the intermediate frame portion 13 with the sleeve 14 extending between the middle fingers. The plunger handle rests in the palm of the user's hand. With the scoop in open position as shown in FIG. 4, a user pushes the open scoop into the material 64 to be scooped. Such pushing into the material to be scooped can be accomplished by pushing directly against plunger handle 16. As long as plunger handle 16 is not moved in relation to frame 10, the scoop halves will not move to closed position. Pushing force can be applied directly to handle 16 and the scoop will remain in open position. Thus, by pushing with the palm of a user's hand, the user can apply body weight through the user's arm. For pushing the open scoop into material to be scooped, various positions for holding the device and applying pushing force to either plunger handle 16 or frame 10 with either one or two hands, can be used. Preferably, at least when the scoop is used for portioning as well as serving, the scoop is pushed into the material until the material fills the open scoop halves, as shown. The user, holding the device as shown in FIG. 4, then closes his or her hand to squeeze the plunger toward the scoop (squeeze the plunger handle 16 toward the frame 10) and close the scoop thereby forcing the edges 61 of the scoop halves together to cut through the material 64 and form a scoop of material in the closed scoop. It has been found that once the scoop halves have been partially closed, applying pressure on the plunger handle tending to push the scoop further into the material will finish closing the scoop halves and further squeezing pressure is not necessary. For the purpose of cutting through the material during closing of the scoop halves, the scoop edges 61 may be tapered as at 65 to sharpen the edges 61. However, the edges generally, except in special circumstances, should not be sharp enough that the edges will pose a danger to a user. When closed, the scoop is removed from the material to be scooped with the scoop of material 66 remaining in the closed scoop halves as shown in FIG. 3. The device is moved to the location where the scoop of material is desired to be deposited and the user opens his or her hand to release the plunger handle 16 and allow the spring 18 to move the scoop halves to open position to release the scoop of material 66 from the scoop halves.

As used herein, the term "scoop half" or "scoop halves," refer to two pieces that together make up the scoop of the device. The scoop itself formed by the scoop halves will generally be only about one half of a three dimensional geometric shape such as a sphere or ellipsoid so generally each scoop half will form about one quarter of the geometric shape. However, the shape formed by the scoop halves may be more or less than one half of the geometric shape. Further, when referring to "scoop halves" or a "scoop half," each half does not have to make up a full or exact half of the scoop, but merely a part of the scoop. Therefore, although referred to as "halves," one scoop half could make up, for example, one third of the scoop while the other "half" could make up two thirds of the scoop.

An important consideration with scoop devices is how easily the scoop device will release the material collected in the scoop. Release of material from a scoop is a problem as shown by the various scoop release devices, such as scrapers that move across the surface of a scoop, used to release the material as in many prior art scoop devices. Generally, it is desired that after material is collected in the scoop, the scoop be easily opened to allow the material to fall from the open scoop. In order to ensure that the scoop of the invention can easily be opened to release the material collected in the scoop, it is preferred that the scoop halves be elongated in the direction of insertion of the scoop into the material to be scooped, i.e., along the axis 67 shown in FIG. 4. Thus, it is preferred that the scoop form a portion of an ellipsoid or other oval shape rather than forming a portion of a sphere. Thus, as shown in FIGS. 1, 2, and 4, the scoop halves when in open position form a portion of an ellipsoid. Further, each of the edges 60 form a portion of an ellipse. It has been found that when the scoops are portions of spheres, the scoop of material formed in the closed scoop halves may interfere with the opening of the scoop halves and may interfere with the release of the material from the scoop halves. It has also been found that when the scoop halves are elongated in the direction of insertion into the material to be scooped, that the scoop of material 66 formed in the scoop halves does not completely fill the closed scoop as shown in FIG. 3. This means that the scoop halves can easily move to open position under the influence of spring 18 without interference from the material in the scoop halves. Also, since the scooped material, once the scoop halves move to closed position, is not tightly packed against the inner sides of the scoop, it more readily releases from the scoop when the scoop moves to the open position. While scoop edges 60 preferably form a portion of an oval such as an ellipse, the edges 61 may form a portion of a circle, and where the shape formed by the scoop is a portion of an ellipsoid, edges 61 will substantially form a circle. This edge, when the scoop is in open position, does not appear to interfere with release of the scoop of material.

Although attaching the ends of the lever arms to the frame and scoop halves using pivot pins and attaching the fulcrum to the pivot plate using pivot pins as described and shown in FIGS. 1–4 works well and is presently preferred, other coupling means could be used, the important thing being that the lever arms are rotatably coupled so that relative movement between the pivot plate and the frame causes movement of the lever arms to open and close the scoop halves. FIG. 5 shows an alternate coupling of the lever arm ends to the frame. Frame ends 70 and 71 include teeth 72 formed therein. Lever arms 74, similar to lever arms 20 and 21, have ends 75 with teeth 76 extending therefrom which mate with frame teeth 72 in the manner of a gear. Arm ends 75 are held in position against frame ends 70 and 71 by reason of the pivotal attachment of the fulcrums of the arms to pivot plate 17 by pins 52 and 53 and by the limited movement allowed lever arm ends 23 by reason of attachment to the scoop halves through tabs 32 and 33 with pins 36 and 37. Operation of the device of FIG. 5 is similar to the of FIGS. 1–4.

FIG. 6 shows a further embodiment of the device of the invention. In the embodiment of FIG. 6, rather than the end of each lever arm being coupled to the frame and the fulcrum coupled to the pivot plate, the coupling is reversed. Thus, frame 80 includes end portions 81 and 82 with an intermediate joining portion 83. Plunger 84 extends through intermediate portion 83 and has a plunger handle 85 at one end and a pivot plate 86 at the opposite end. Lever arms 87 and 88 are received in slots 89 and 90 in frame end portions 81 and 82, respectively, and are pivotally attached therein by pins 91 and 92. End portions 93 of the lever arms 87 and 88 are received in slots 94 and 95 in pivot plate 86, and are attached therein by pins 96 and 97. Ends 98 of lever arms 87 and 88 are received in slots in tabs 100 and 101 attached to scoop halves 102 and 103, and are pivotally attached therein by pins 104 and 105. Operation of the device is as described for the prior embodiments. Movement of the plunger causes movement of the pivot plate with respect to the frame, which causes movement of ends 98 of lever arms 87 and 88 away from one another which rotate the scoop halves to closed position. Release of plunger handle 85 allows spring 106 to move the plunger back to the position shown in FIG. 6, and scoop halves 102 and 103 rotate back to open position.

In the illustrated embodiments of FIGS. 1–4 and 6, the frame may be of single piece construction with the slots cut or milled into the frame ends and a hole drilled through the sleeve as in FIGS. 1–4 or the frame as in FIG. 6, or the frame can be assembled from several pieces such as outside frame members secured to core members where the ends of the outside members extend beyond the core members to form the slots. In the embodiment of FIG. 5, the core members may form teeth 72. Sleeve 14 of FIGS. 1–4 can be secured in the frame in any suitable manner. Alternately, the frame could be cast or molded of either metal or plastic. The pivot plate may similarly be of single piece construction, multi-piece construction, or cast or molded.

While the embodiments shown are biased to open position, the biasing can be arranged to bias the scoop halves to closed position and the lever arms arranged to open the scoop halves against the bias. Further, the plunger and plunger handle and/or the lever arms may be arranged for opposite movement of the scoop halves with plunger movement or be arranged for opposite movement of the plunger handle to operate the scoop halves. For example, the plunger handle could extend from the plunger on the same side of the frame as the pivot plate or extend from the pivot plate so is pulled toward the handle when the hand is squeezed to operate the scoop halves. In such arrangement, the plunger would probably be arranged so it would not extend completely through the frame. Other means of coupling the pivot plate for restrained movement with respect to the frame (allowed movement is restrained or controlled by the coupling means) could also be used, whereby the user could cause movement of the pivot plate along its restrained path of movement with respect to the frame to thereby cause movement of the lever arms and operation of the scoop halves.

Further, while the embodiments shown are particularly easy to use because the force to push the scoop into the material to be scooped is applied through the user's arm and body weight can be applies, and such advantages are present regardless of the shape of the scoop halves (the halves can be portions of spheres as well as elongated shapes) various other arrangements for operating a scoop having scoop halves which rotate between open and closed positions, now known or developed in the future, can be used. In such other arrangements, the elongation of the scoop halves in the direction of insertion into the material to be scooped allows for easy discharge of the scooped material.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A scoop device for scooping portions of material, comprising:
   a frame;
   a plunger extending through the frame and having opposite ends;
   a plunger handle attached to one of the opposite ends of the plunger and positioned on one side of the frame;
   a pair of scoop halves pivotally connected to move between an open position allowing the scoop to be pushed into material to be scooped with such material entering the scoop, and a closed position;
   a pivot plate attached to the end of the plunger opposite the end to which the plunger handle is attached so that movement of the plunger causes movement of the pivot plate in relation to the frame; and
   a pair of lever arms, each lever arm being coupled between the frame, the pivot plate, and a scoop half;
   whereby, moving the plunger moves the pivot plate in relation to the frame causing the lever arms to move to open or close the scoop halves.

2. A scoop device for scooping portions of material according to claim 1, wherein each lever arm includes opposite ends and an intermediate fulcrum, and wherein one end of each lever arm is coupled to the frame, the other end of each lever arm is coupled to a scoop half, and the intermediate fulcrum of each lever arm is coupled to the pivot plate.

3. A scoop device for scooping portions of material according to claim 2, wherein the fulcrum of each lever arm is pivotally attached to the pivot plate.

4. A scoop device for scooping portions of material according to claim 3, wherein the ends of the lever arms coupled to the scoop halves are each pivotally attached to a scoop half.

5. A scoop device for scooping portions of material according to claim 4, wherein the ends of the lever arms coupled to the frame are pivotally attached to the frame.

6. A scoop device for scooping portions of material according to claim 4, wherein the ends of the lever arms coupled to the frame are rotatably coupled to the frame.

7. A scoop device for scooping portions of material according to claim 6, wherein the ends of the pivot arms rotatably coupled to the frame include teeth which mate with teeth in the frame.

8. A scoop device for scooping portions of material according to claim 1, wherein each lever arm includes opposite ends and an intermediate fulcrum, and wherein one end of each lever arm is coupled to the pivot plate, the other end of each lever arm is coupled to a scoop half, and the intermediate fulcrum of each lever arm is coupled to the frame.

9. A scoop device for scooping portions of material according to claim 8, wherein the fulcrum of each lever arm is pivotally attached to the frame.

10. A scoop device for scooping portions of material according to claim 9, wherein the ends of the lever arms coupled to the scoop halves are each pivotally attached to a scoop half.

11. A scoop device for scooping portions of material according to claim 10, wherein the ends of the lever arms coupled to the pivot plate are pivotally attached to the pivot plate.

12. A scoop device for scooping portions of material according to claim 1, additionally including a spring biasing the scoop to a desired position.

13. A scoop device for scooping portions of material according to claim 12, wherein the spring biases the scoop to open position.

14. A scoop device for scooping portions of material according to claim 13, wherein the spring biases the plunger to a position representing the open position of the scoop.

15. A scoop device for scooping portions of material according to claim 1, wherein, when the scoop halves move from an open to a closed position, the scoop halves cut through the material to be scooped thereby forming a scoop of material in the closed scoop halves.

16. A scoop device for scooping portions of material according to claim 1, wherein the scoop halves in open position form a portion of a geometrical shape elongated from a portion of a sphere along the direction of insertion of the scoop into the material to be scooped.

17. A scoop device for scooping portions of material according to claim 16, wherein the scoop halves form a portion of an ellipsoid.

18. A scoop device for scooping portions of material according to claim 16, wherein the geometrical shape has an elongate axis and wherein a cross section taken along the elongate axis forms a portion of an oval.

19. A scoop device for scooping portions of material according to claim 1, wherein the frame is substantially "C" shaped and the respective lever arms are coupled to opposite end portions of the "C".

20. A scoop device for scooping portions of material according to claim 19, wherein the plunger extends through the frame intermediate the opposite ends of the "C".

21. A scoop device for scooping portions of material according to claim 20, wherein the substantially "C" shaped frame is adapted to be held in the hand of a user with fingers holding the intermediate portion of the frame between the opposite ends of the "C", and the plunger handle extends into the palm of a user's hand so that the plunger handle is moved toward the frame by squeezing the user's hand.

22. A scoop device for scooping portions of material, comprising:
   a pair of scoop halves pivotally connected along a common axis to move between an open position allowing the scoop to be pushed into material to be scooped with such material entering the scoop, and a closed position, said scoop halves, when in open position, together forming a portion of a geometrical shape elongated from a portion of a sphere along the direction of insertion of the scoop into the material to be scooped;
   handle means mounting the scoop halves to be held and manipulated by a user; and
   means operable by the user for moving the scoop halves between the open and closed positions.

23. A scoop device for scooping portions of material according to claim 22, wherein the elongated geometrical shape is a portion of an ellipsoid.

24. A scoop device for scooping portions of material according to claim 22, wherein the elongated geometrical shape has an elongate axis and wherein a cross section taken along the elongate axis forms a portion of an oval.

25. A scoop device for scooping portions of material, comprising:

a frame;

a pair of scoop halves pivotally connected to move between an open position allowing the scoop to be pushed into material to be scooped with such material entering the scoop, and a closed position;

a pivot plate;

means coupling the pivot plate to the frame and allowing restrained relative movement of the pivot plate with respect to the frame along a restrained path of movement whereby a user can move the pivot plate along its restrained path of movement; and a pair of lever arms, each lever arm having opposite ends and a fulcrum and being coupled between the frame, the pivot plate, and a scoop half;

whereby, moving the pivot plate in relation to the frame causes the lever arms to move to open or close the scoop halves.

26. A scoop device for scooping portions of material according to claim 25, wherein the fulcrum of each lever arm is located intermediate the opposite ends of the lever arm, and wherein moving the pivot plate in relation to the frame causes each lever arm to rotate about its fulcrum to open or close the scoop halves.

27. A scoop device for scooping portions of material, comprising:

a pair of scoop halves pivotally connected to move between an open position allowing the scoop to be pushed into material to be scooped with such material entering the scoop, and a closed position, said scoop halves when in open position forming a portion of a geometrical shape elongated from a portion of a sphere along the direction of insertion of the scoop into the material to be scooped, said scoop halves pivotally connected to rotate between open and closed position about a common axis passing through the geometrical shape;

handle means mounting the scoop halves to be held and manipulated by a user; and means operable by the user for moving the scoop halves between the open and closed positions.

28. A scoop device for scooping portions of material according to claim 27, wherein the elongated geometrical shape is a portion of an ellipsoid.

29. A scoop device for scooping portions of material according to claim 27, wherein the elongated geometrical shape has an elongate axis and wherein a cross section taken along the elongate axis forms a portion of an oval.

* * * * *